United States Patent
Chang et al.

(10) Patent No.: US 7,623,569 B2
(45) Date of Patent: Nov. 24, 2009

(54) APPARATUS AND METHOD FOR ESTIMATING INTERFERENCE AND NOISE IN A COMMUNICATION SYSTEM

(75) Inventors: Jae-Hwan Chang, Suwon-si (KR); Yun-Sang Park, Suwon-si (KR); Sang-Hoon Sung, Suwon-si (KR); Chan-Young Kim, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 852 days.

(21) Appl. No.: 10/958,485

(22) Filed: Oct. 5, 2004

(65) Prior Publication Data

US 2005/0152480 A1    Jul. 14, 2005

(30) Foreign Application Priority Data

Jan. 14, 2004 (KR) ............ 10-2004-0002764
Apr. 30, 2004 (KR) ............ 10-2004-0030569

(51) Int. Cl.
  *H04B 3/46* (2006.01)
(52) U.S. Cl. ................. 375/227; 375/340; 375/346; 375/349
(58) Field of Classification Search ........... 375/227, 375/254, 285, 340, 346, 347, 349; 370/207, 370/480
  See application file for complete search history.

(56) References Cited

U.S. PATENT DOCUMENTS

| | | | |
|---|---|---|---|
| 6,317,456 B1 | 11/2001 | Sayeed | |
| 6,456,653 B1 | 9/2002 | Sayeed | |
| 2003/0016622 A1* | 1/2003 | McCarty, Jr. | ............ 370/207 |
| 2003/0223354 A1 | 12/2003 | Olszewski | |

FOREIGN PATENT DOCUMENTS

| | | |
|---|---|---|
| EP | 1 207 663 | 11/2001 |
| EP | 1 303 064 | 4/2003 |
| JP | 11-252040 | 9/1999 |
| JP | 2001-103032 | 4/2001 |
| JP | 2002-124931 | 4/2002 |
| JP | 2002-158631 | 5/2002 |
| JP | 2002-232388 | 8/2002 |
| JP | 2003-069523 | 3/2003 |
| JP | 2003-229919 | 8/2003 |
| JP | 2003-324407 | 11/2003 |
| JP | 2004-072724 | 3/2004 |
| KR | 10-2000-0066459 | 11/2000 |
| RU | 2 235 435 | 6/2000 |
| RU | 2 192 094 | 2/2001 |
| SU | 809592 | 2/1981 |

OTHER PUBLICATIONS

Muneta et al., "A New Frequency-Domain Link Adaptation Scheme for Broadband OFDM Systems", 1999 IEEE, pp. 253-257.

* cited by examiner

*Primary Examiner*—Shuwang Liu
*Assistant Examiner*—Jaison Joseph
(74) *Attorney, Agent, or Firm*—The Farrell Law Firm, LLP

(57) ABSTRACT

A method and apparatus for estimating interference and noise power in an orthogonal frequency division multiplexing/orthogonal frequency division multiple access/discrete multi-tone (OFDM/OFDMA/DMT) system is disclosed. A correlator correlates a plurality of sub-carriers with a preset reference sequence on an element-by-element basis and outputs a result of the correlation. A signal noise producer calculates a difference between a correlation value associated with each of the plurality of sub-carriers output from the correlator and a correlation value produced from at least one adjacent sub-carrier and outputs a result of the calculation. An interference and noise power producer produce interference and noise power from the difference between the correlation values calculated by the signal noise producer.

33 Claims, 9 Drawing Sheets

APPARATUS AND METHOD FOR ESTIMATING INTERFERENCE AND NOISE IN A COMMUNICATION SYSTEM

PRIORITY

This application claims priority to two applications entitled "METHOD AND APPARATUS FOR ESTIMATING CINR IN OFDM RECEIVER", filed in the Korean Intellectual Property Office on Jan. 14, 2004 and Apr. 30, 2004 and assigned Serial Nos. 2004-0002764 and 2004-0030569, respectively, the contents of both of which are incorporated herein by reference.

BACKGROUND OF THE INVENTION

1. Field of the Invention

The present invention relates generally to an apparatus and method for estimating interference and noise and more particularly to an apparatus and method for estimating a carrier to interference and noise ratio (CINR) that can estimate the CINR as one measure of reception performance in a wireless communication system.

2. Description of the Related Art

Recently, orthogonal frequency division multiplexing (OFDM) or orthogonal frequency division multiple access (OFDMA) has been used as a method for high-speed data transmission in a wired/wireless channel as a method for transmitting data using a plurality of sub-carriers. According to the OFDM/OFDMA, a serial to digital conversion operation is performed on input data, parallel data is modulated into a plurality of sub-carriers, that is, sub-channels, having inter-orthogonality, and the modulated parallel data is transmitted.

The OFDM is commonly applied to digital transmission technology such as digital/audio broadcasting, digital television (TV), a wireless local area network (WLAN), a wireless asynchronous transfer mode (WATM), a fixed or mobile broadband wireless access (BWA), etc.

Previously, the OFDM was not widely used because of hardware complexity, but the OFDM has recently become implementable with the development of various digital signal processing technologies including fast Fourier transform (FFT) and inverse fast Fourier transform (IFFT). The OFDM is similar to conventional frequency division multiplexing (FDM) and can acquire optimum transmission efficiency during high-speed data transmission by transmitting sub-carriers while maintaining orthogonality there between. The OFDM has better frequency efficiency and is inherently robust against multi-path fading. The OFDM is robust against frequency selective fading using a superimposed frequency spectrum and reduces the effects of inter-symbol interference using a guard interval. Therefore, the OFDM enables simple design of a hardware equalizer and is robust against impulse noise.

The OFDM system may be required to measure a carrier to interference and noise ratio (CINR) as a parameter necessary for power control or adaptive modulation/and coding.

In the prior art relating to the OFDM system, there is "FAST AND ACCURATE SIGNAL-TO-NOISE RATIO ESTIMATION TECHNIQUE FOR OFDM SYSTEMS", U.S. Pat. No. 6,456,653. U.S. Pat. No. 6,456,653 discloses a method for estimating a noise level from unused sub-carriers. The OFDM system performs an IFFT operation for data to be transmitted from a transmitter and transmits a result of the IFFT operation. When an IFFT size is based on N FFT points, N sub-carriers are used and N unused sub-carriers are filled with zeros. Among signals undergoing the FFT conversion of a receiver, the mixed data and noise are output from the N used sub-carriers, and only noise is output from the N unused sub-carriers. In U.S. Pat. No. 6,456,653, a noise level is measured from the N unused sub-carriers. It is assumed that a value of the measured noise level is the same as a level of noise mixed with data. The noise level is subtracted from a power level received from the N used sub-carriers, such that a true-signal level is estimated. As a result, a ratio between the true-signal level and the noise level is obtained as a desired SNR estimation value.

However, the conventional SNR estimation method suffers extreme degradation in estimation performance when the number of unused sub-carriers is very small as compared with the number of used sub-carriers. Further, the conventional SNR estimation method cannot estimate an interference signal, because the interference signal is not incoming into the unused sub-carriers from other users using the same band.

SUMMARY OF THE INVENTION

Therefore, the present invention has been designed in view of the above and other problems, and it is an object of the present invention to provide an interference and noise estimation apparatus and method for estimating a carrier to interference and noise ratio (CINR) in an orthogonal frequency division multiplexing/orthogonal frequency division multiple access/discrete multi-tone (OFDM/OFDMA/DMT) system, and a CINR estimation apparatus and method thereof.

In accordance with an aspect of the embodiment of the present invention, the above and other objects can be accomplished by an apparatus for estimating noise power in a communication system. The apparatus includes: a correlator for correlating a plurality of sub-carriers with a preset reference sequence on an element-by-element basis and outputting a result of the correlation; a noise calculator for calculating a difference between/among a correlation value associated with each of the plurality of sub-carriers and a correlation value produced from at least one adjacent sub-carrier; and a noise power calculator for calculating noise power from the difference between the correlation values calculated by the noise calculator.

In accordance with another aspect of the present invention, the above and other objects can be accomplished by a method for correlating a plurality of sub-carriers with a reference sequence on an element-by-element basis; calculating a difference between/among a correlation value associated with each of the plurality of sub-carriers and a correlation value produced from at least one adjacent sub-carrier; and calculating noise power from the difference between/among the correlation values associated with the sub-carriers.

The embodiment of present invention estimates the interference and noise power using channel characteristics based on the similarity between received signal sub-carriers that are adjacent to each other in frequency. In a difference between adjacent sub-carriers of the embodiment of present invention, signal components are canceled out and therefore, only interference and noise components remain.

Wherein the above difference may be estimated noise value if there is noise. The above difference may be estimated interference and noise value if there are interference and noise.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may obscure the subject matter of the present invention.

Figure 1:
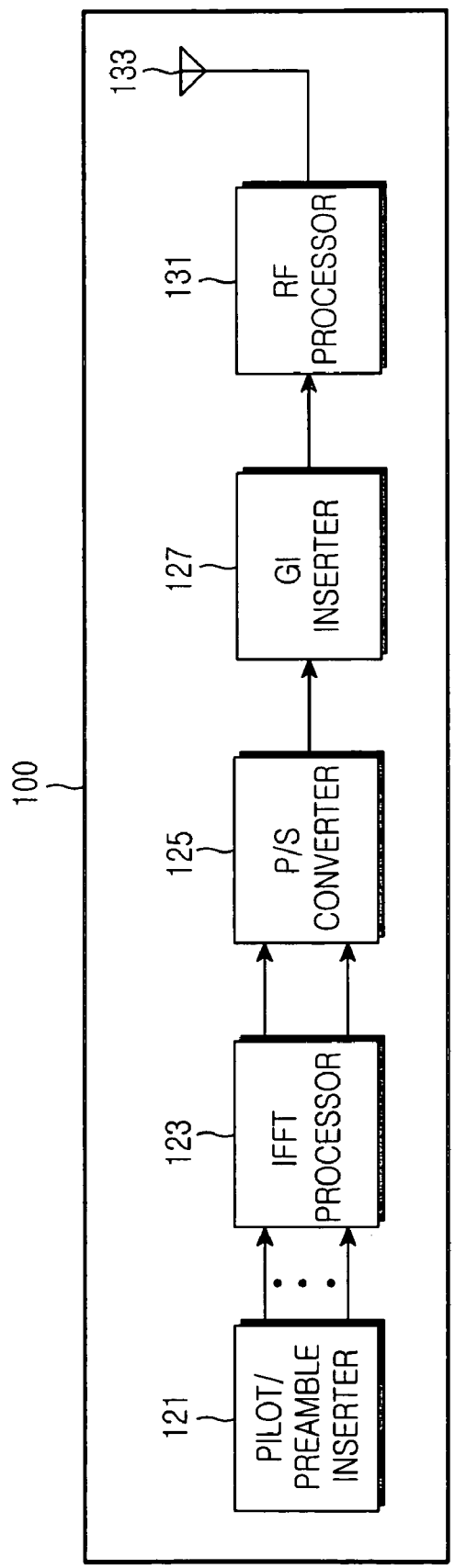
FIG. 1 is a block diagram illustrating a conventional orthogonal frequency division multiplexing (OFDM) transmitter.

FIG. 1 is a block diagram illustrating a conventional orthogonal frequency division multiplexing (OFDM) transmitter. Referring to FIG. 1, the OFDM transmitter 100 includes a pilot/preamble inserter 121, an inverse fast Fourier transform (IFFT) processor 123, a parallel-to-serial (P/S) converter 125, a guard interval (GI) inserter 127, a radio frequency (RF) processor 131, and an antenna 133. The pilot/preamble inserter 121 generates a plurality of sub-channels and a pilot symbol and a preamble set in the OFDM communication system. The pilot/preamble inserter 121 inserts the generated pilot symbol into the plurality of sub-channels, that is, data symbols. The pilot sub-carrier is inserted into the sub-channels conveying the data symbols in order to perform channel estimation. Locations of pilot sub-carriers to be transmitted are pre-defined in the OFDM communication system. Moreover, the generated preamble is typically located at a frame header in the form of one OFDMA symbol.

In accordance with a preferred embodiment of the present invention, the pilot and preamble use different sequences according to a base station.

The IFFT processor 123 performs an IFFT operation for a plurality of input sub-channels and then outputs a result of the IFFT operation to the P/S converter 125. The P/S converter 125 converts an input parallel signal into a serial signal and outputs the serial signal to the GI inserter 127. The GI inserter 127 inserts a GI for reducing the effects of inter-symbol interference (ISI), etc., between sub-channels output from the IFFT processor 123, and outputs a result of the insertion to the RF processor 131. The RF processor 131 transmits channel data received from the GI inserter 127 via an antenna 133.

Figure 2:
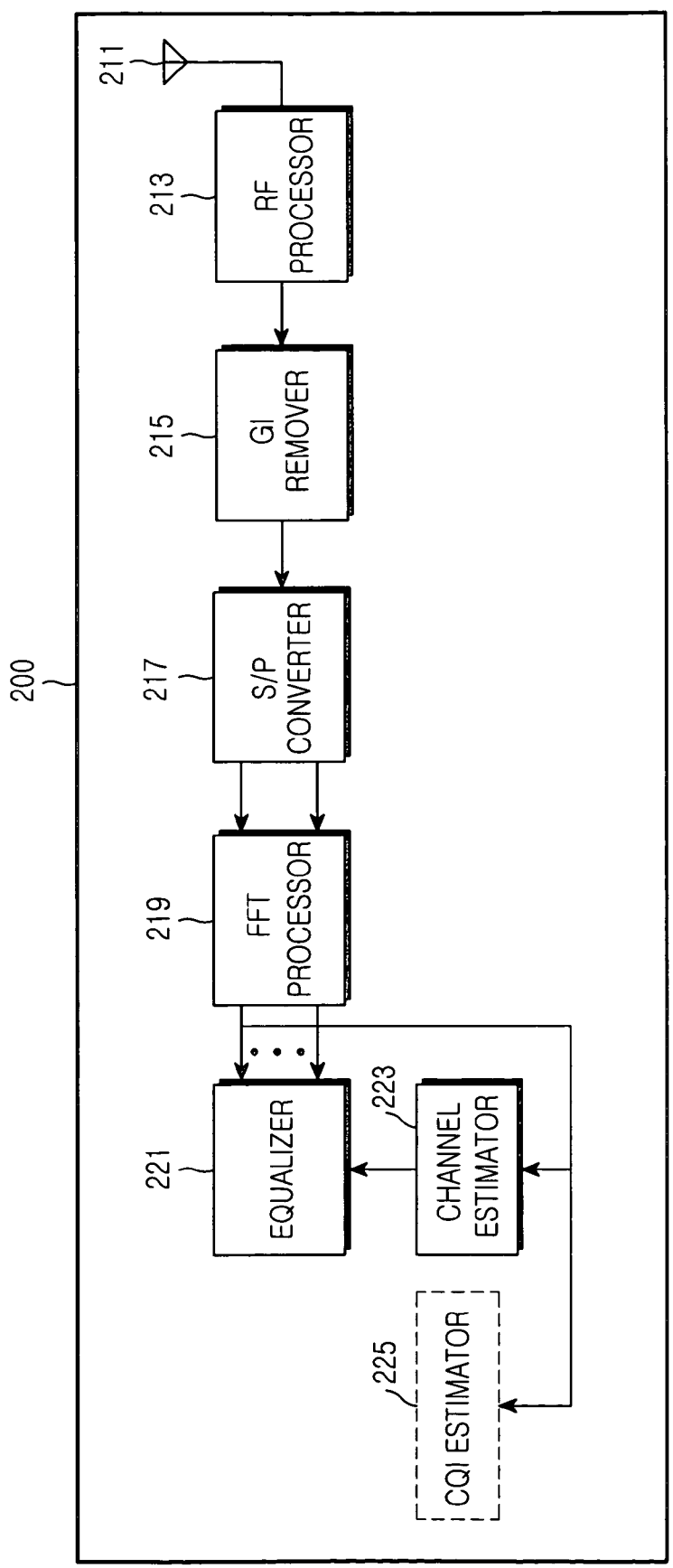
FIG. 2 is a block diagram illustrating an OFDM receiver including a carrier to interference and noise ratio (CINR) estimator in accordance with the present invention.

FIG. 2 is a block diagram illustrating an OFDM receiver including a carrier to interference and noise ratio (CINR) estimator in accordance with the present invention. Referring to FIG. 2, the OFDM receiver 200 includes an antenna 211, an RF processor 213, a guard interval (GI) remover 215, a serial-to-parallel (S/P) converter 217, an FFT processor 219, an equalizer 221, a channel estimator 223, and a channel quality information (CQI) estimator 225.

The RF processor 213 outputs channel data from a radio channel received via the antenna 211 to the GI remover 215. The GI remover 215 removes a GI from the received channel data. The S/P converter 217 converts serial data from which the GI is removed and redundant data into a plurality of pieces of parallel data, and outputs the pieces of parallel data to the FFT processor 219. The FFT processor 219 performs an FFT operation for the pieces of parallel data and redundant data, and outputs a result of the FFT operation to the equalizer 221. The equalizer 221 removes channel signal distortion associated with the serial data and redundant data based on the result of the FFT operation, and outputs data from which the signal distortion is removed. The channel estimator 223 estimates a channel state, i.e., the distortion in phase and amplitude on a frequency domain due to channel degradation incurred at the transmission and reception time and compensates for the distortion. The CQI estimator 225 measures channel quality, that is, a carrier to interference and noise ratio (CINR).

When the OFDM transmitter in accordance with the present invention sends a digital signal based on the reference signal (e.g., a pilot signal), the OFDM receiver receives the digital signal and measures a CINR from the digital signal received thereby. More specifically, the present invention uses a pilot signal after the FFT operation, such that the CINR can be measured. For the convenience of explanation, it is assumed that the pilot signal has a preset sequence and that binary phase shift keying (BPSK) modulation is used. Here, the pilot sequence consists of 1's and 0's. It is assumed that a signal denoted by "1" is transmitted as a complex-number signal "1" and a signal denoted by "0" is transmitted as a complex-number signal "−1" without loss of generality.

Although the reference signal is considered as a pilot signal in the preferred embodiment of the present invention, if there is a preamble located in a front part of a frame, a mid-amble located in the middle thereof, and a post-amble located in the end thereof, each of these items or the combination thereof can also be used.

Figure 3:
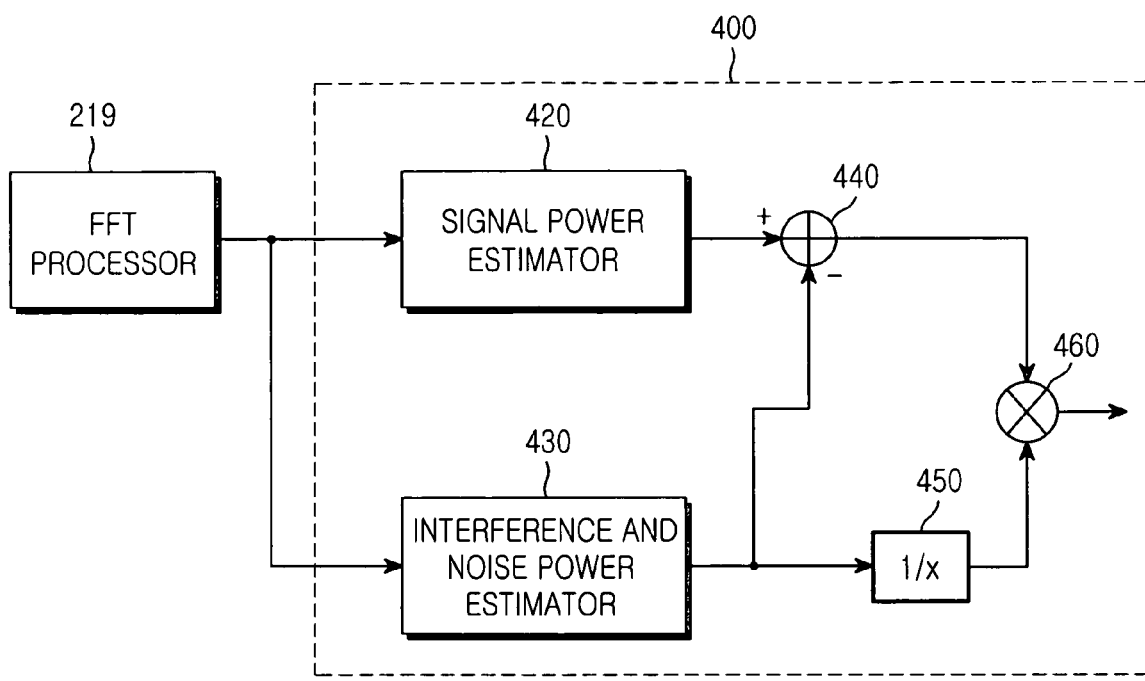
FIG. 3 is a block diagram illustrating a CINR estimator in accordance with the present invention.

FIG. 3 is a block diagram illustrating a configuration of the CINR estimator in accordance with the present invention.

Referring to FIG. 3, the CINR estimator 400 receives a pilot signal output from the FFT processor 219 and outputs the received signal to a signal power estimator 420 and an interference and noise power estimator 430. The signal power estimator 420 estimates power of the received signal. More specifically, the signal power estimator 420 produces power of each sub-carrier included in the signal received from the FFT processor 219. Subsequently, the signal power estimator 420 produces the total signal power by summing all sub-carrier power values, and then outputs the produced signal power to a subtracter 440.

Further, the interference and noise power estimator 430 estimates interference and noise power of the received signal. The embodiment of the present invention estimates the interference and noise power using channel characteristics based on the similarity between received signal sub-carriers that are adjacent to each other in frequency. That is, the present invention uses a difference between adjacent sub-carrier signals.

For convenience, the above-described method is referred to as a difference of adjacent sub-carrier signal (DASS)-based method in the embodiment of the present invention.

More specifically, the interference and noise power estimator 430 correlates a preset pilot sequence with a plurality of sub-carriers of the received signal on an element-by-element basis, and produces correlation values associated with the plurality of sub-carriers. Subsequently, the interference and noise estimator 430 calculates the difference between a correlation value of each sub-carrier and a correlation value produced from at least one adjacent sub-carrier. The number of adjacent sub-carriers having similar channel characteristics can be arbitrarily designated. Typically, an adjacent sub-carrier of each sub-carrier can be a sub-carrier closest to each sub-carrier. That is, the number of sub-carriers can be different according to characteristics of the communication system to which the present invention is applied. For example, in order for the system to be simply implemented, only one sub-carrier closest to each sub-carrier can be used. Alternatively, the number of adjacent sub-carriers can be differently used in relation to each sub-carrier.

Because adjacent sub-carriers have almost identical channel characteristics, signal components are canceled out and therefore, only interference and noise components remain in the difference between the correlation values. The interference and noise power estimator 430 produces interference and noise power from the interference and noise components, and outputs the produced interference and noise power to the subtracter 440. The subtracter 440 subtracts the interference and noise power produced by the interference and noise power estimator 430 from the signal power produced by the signal power estimator 420 and produces power of the pure received signal where the interference and noise components have been removed.

Subsequently, a reciprocal-number generator 450 generates a reciprocal number of the interference and noise power value produced by the interference and noise power estimator 430, and provides the generated reciprocal number of the interference and noise power value to a multiplier 460. The multiplier 460 divides a value of (Total reception power− Total interference and noise power) by the total interference and noise power in order to produce a CINR estimation value. That is, the CINR estimation value is a ratio between the estimation value of true-signal power and the estimation value of interference and noise power.

The present invention includes three different pilot sequence location patterns to be used for estimating the CINR according to a sub-carrier signal in the received pilot signal. The three methods will be described herein below with reference to FIGS. 4A to 4C.

Figure 4A:
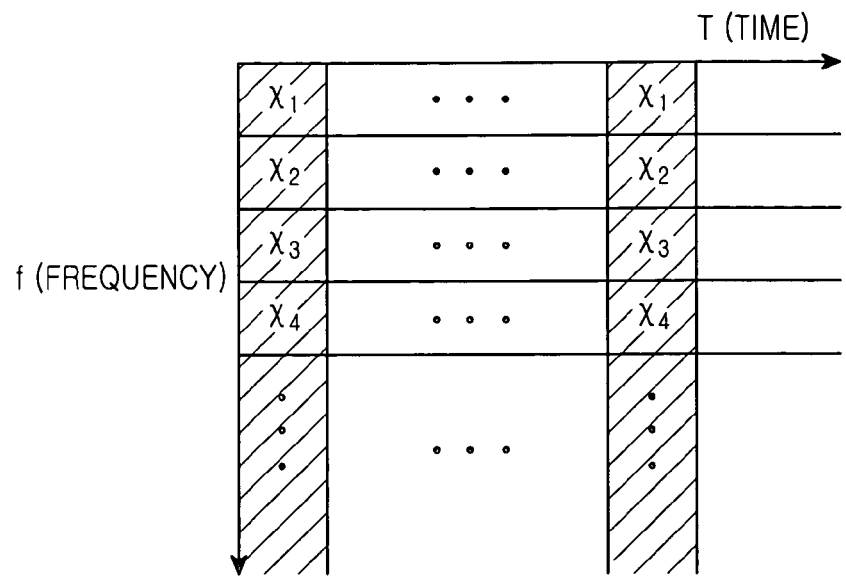
FIGS. 4A to 4C are explanatory views illustrating CINR estimation methods in accordance with embodiments of the present invention.
Figure 4B:
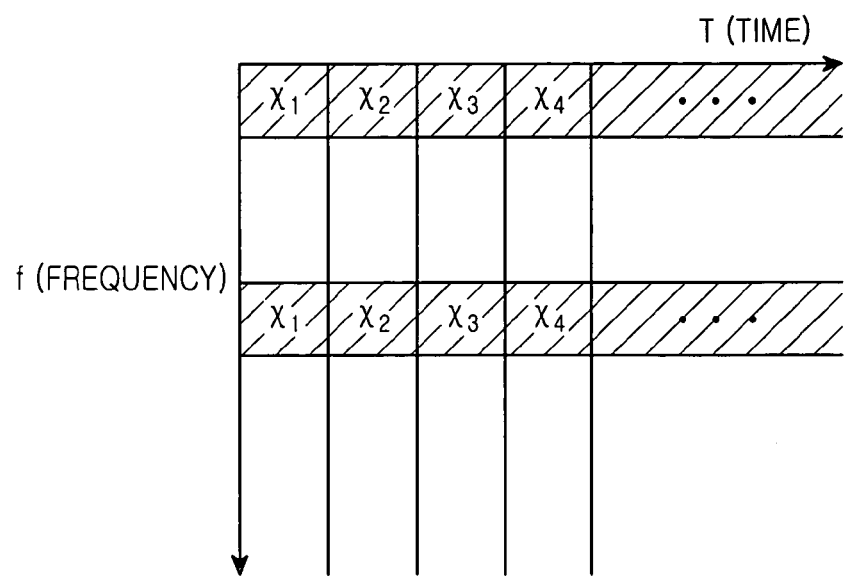
Figure 4C:
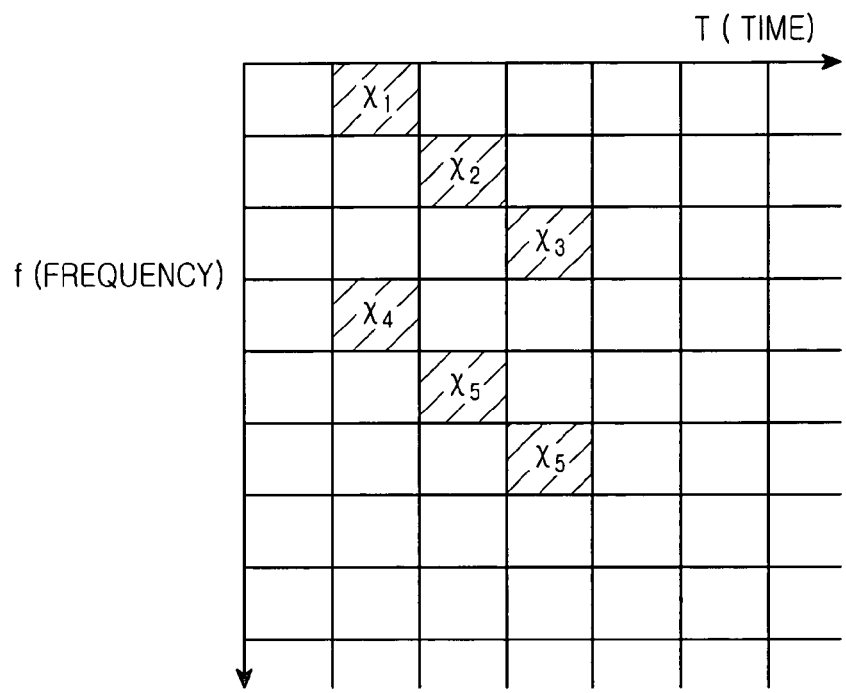

FIGS. 4A to 4C are explanatory views illustrating CINR estimation methods in accordance with the present invention. First, in FIG. 4A, a pilot and/or preamble signal consisting of N sub-carrier signals for the duration of one OFDM symbol is used. A plurality of sub-carriers are present in the same time domain for the OFDM symbol duration. The embodiment illustrated in FIG. 4A takes advantage of the fact that channel characteristics of the sub-carriers on the same time domain are similar to those of adjacent sub-carriers. Accordingly, the CINR estimator 400 uses a plurality of sub-carriers having the same time domain and different frequency domains among sub-carriers of the pilot and/or preamble signal output from the FFT processor 219.

In FIG. 4B, the pilot or preamble signal consisting of N sub-carrier signals for a plurality of OFDM symbol durations is used. As illustrated in FIG. 4B, a plurality of sub-carriers are present on the same frequency domain for the plurality of OFDM symbol durations. The channel characteristics of the sub-carriers on the same frequency domain are similar to those of adjacent sub-carriers. Accordingly, the CINR estimator 400 uses a plurality of sub-carriers having the same frequency domain and different time domains among sub-carriers of the pilot and/or preamble signal output by the FFT processor 219.

In FIG. 4C, a pilot or preamble signal consisting of N sub-carriers within a predetermined data domain including sub-carriers having different frequency domains and different time domains from the received pilot signal is used. That is, a plurality of sub-carriers are randomly selected to be used for estimating the CINR from the predetermined data domain. In this case, a correlation coefficient between each sub-carrier and its adjacent sub-carrier is made to be as close to "1" as possible by selecting the order of the pilot the sub-carriers appropriately. In FIG. 4C, the channel characteristics of sub-carriers close to each other are similar to those of their adjacent sub-carriers. Therefore, the CINR estimator 400 uses the sub-carriers randomly selected from the predetermined data domain consisting of the sub-carriers of the pilot and/or preamble signal output from the FFT processor 219.

Figure 5:
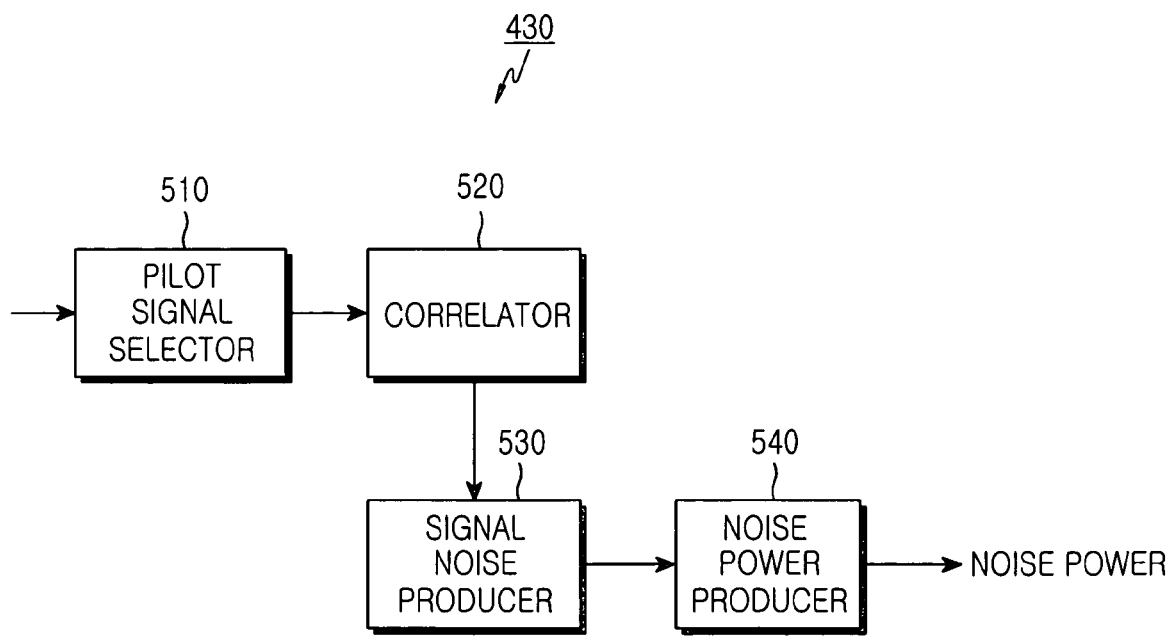
FIG. 5 is a block diagram illustrating an interference and noise power estimator 430 in accordance with the present invention.

FIG. 5 is a block diagram illustrating the interference and noise power estimator 430 in accordance with the present invention. Referring to FIG. 5, the interference and noise power estimator 430 includes a reference signal selector 510, a correlator 520, a signal noise producer 530, and an interference and noise power producer 540. The reference signal selector 510 selects a plurality of sub-carriers to be used for estimating the CINR in accordance with the present invention.

Herein below, a pilot or preamble signal will be exemplarily described as a plurality of sub-carriers to be used for estimating the CINR. However, it should be noted that the present invention is not limited to the embodiment. Any preset signal is sufficient as a reference signal defined between a transmitter and a receiver.

The pilot signal selector 510 selects a plurality of sub-carriers having the same time domain and different frequency domains from among the sub-carriers of the received pilot or preamble signal in accordance with the embodiment illustrated in FIG. 4A. The pilot signal selector 510 selects a plurality of sub-carriers having the same frequency domain and different time domains from among the sub-carriers of the received pilot signal in accordance with the embodiment illustrated in FIG. 4B. The pilot signal selector 510 randomly selects a plurality of sub-carriers having different time domains and different frequency domains from among the received pilot signal in accordance with the embodiment illustrated in FIG. 4C. As described above, a correlation coefficient between each sub-carrier and its adjacent sub-carrier is decided to be close to "1" in accordance with the preferred embodiment of the present invention. However, the present invention is not limited to the embodiment.

As described above, the pilot signal selector 510 selects the plurality of sub-carrier signals to be used for estimating the CINR and outputs the selected sub-carrier signals to the correlator 520. The correlator 520 correlates a preset pilot sequence with the plurality of sub-carriers from the pilot signal selector 510 on an element-by-element basis, produces correlation values associated with the plurality of sub-carriers, and outputs the produced correlation values to the signal noise producer 530. Subsequently, the signal noise producer 530 calculates a difference between a correlation value of each sub-carrier output from the correlator 520 and a correlation value produced from at least one adjacent sub-carrier. The signal noise producer 530 performs an appropriate operation according to the number of adjacent sub-carriers associated with each sub-carrier. As a result, signal components are canceled out and only interference and noise components remain. The noise component associated with the sub-carriers is output to the interference and noise power producer 540. The interference and noise power producer 540 squares a value of the noise component of each sub-carrier and then produces noise power.

Figure 6:
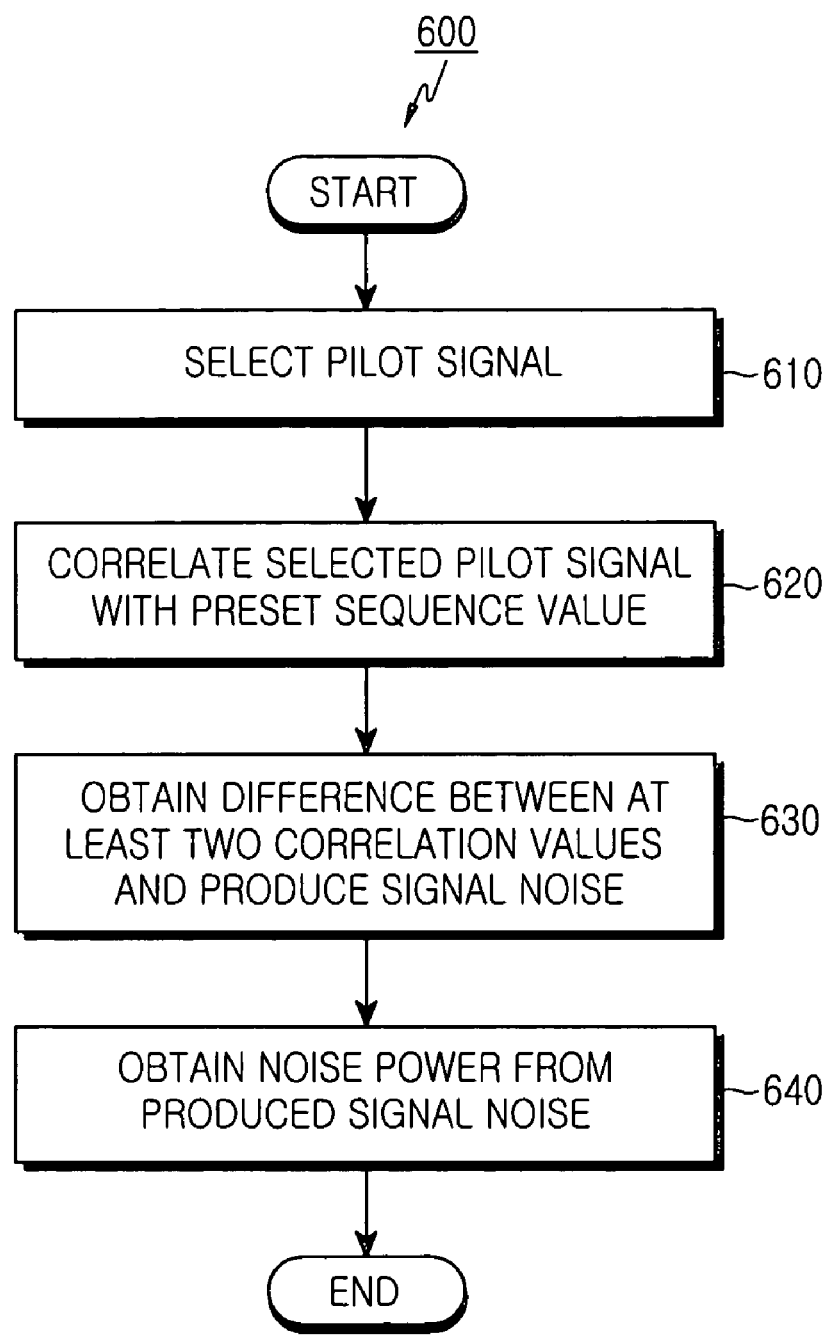
FIG. 6 is a flow chart illustrating a process for estimating interference and noise power in accordance with the present invention.

FIG. 6 is a flow chart illustrating the process for estimating interference and noise power in accordance with the present invention. Referring to FIG. 6, the interference and noise power estimator 430 selects a plurality of sub-carriers to be used for estimating the CINR at step 610. The interference and noise power estimator 430 correlates the plurality of sub-carriers with the preset pilot and/or preamble sequence on an element-by-element basis at step 620. The interference and noise power estimator 430 calculates a difference between a correlation value associated with each sub-carrier and a correlation value produced from at least one adjacent sub-carrier and then produces signal noise at step 630. Subsequently, the interference and noise power estimator 430 produces interference and noise power from the interference and noise components of respective sub-carriers at step 640.

Figure 7:
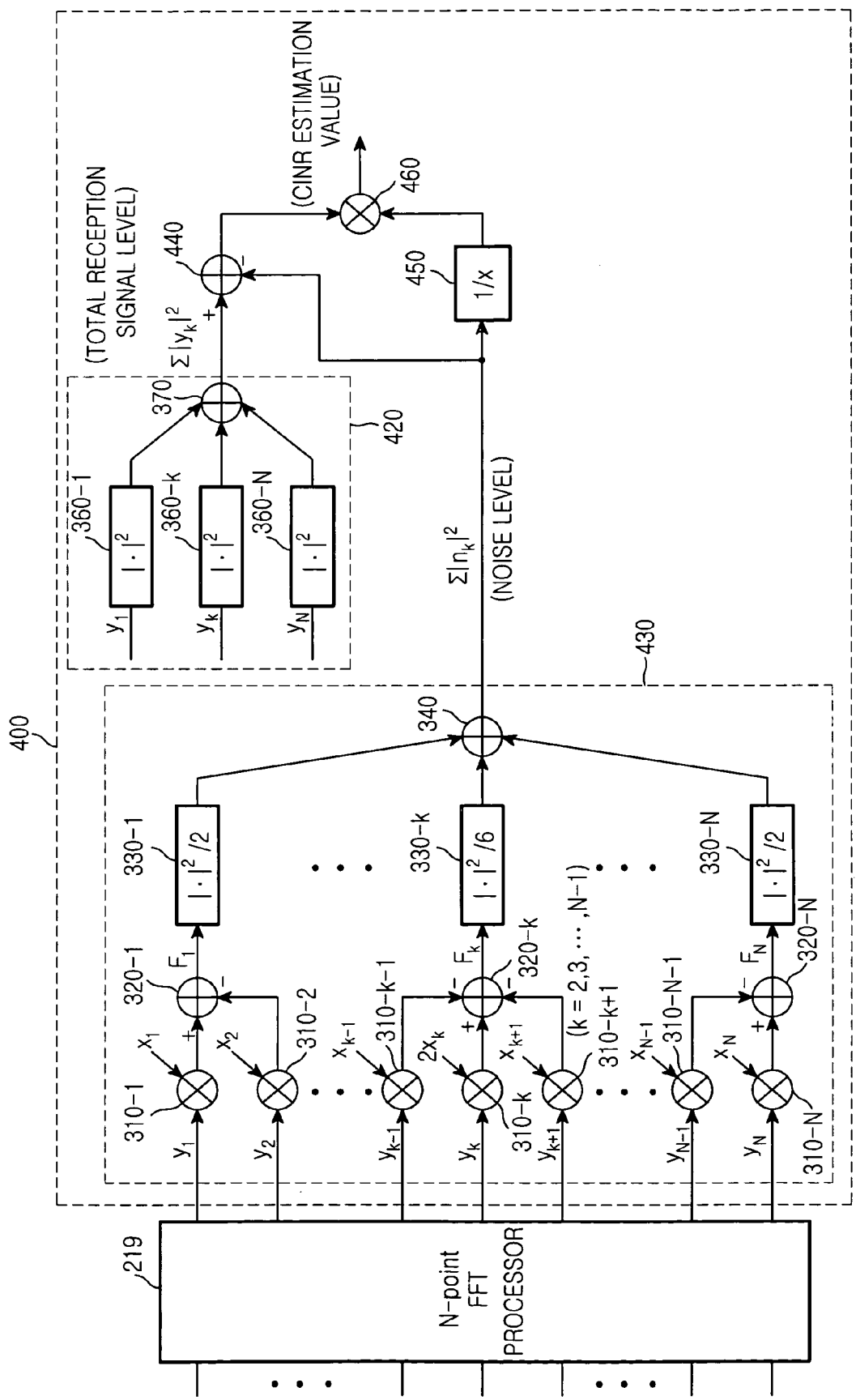
FIG. 7 is a schematic diagram illustrating a CINR estimator in accordance with the present invention.

FIG. 7 is a schematic diagram illustrating a CINR estimator in accordance with the present invention. The CINR estimator in accordance with the present invention uses a pilot signal consisting of N sub-carrier signals for the duration of one OFDM symbol and uses two adjacent sub-carriers associated with each sub-carrier. Those skilled in the art will appreciate that the present invention is not limited to the above-described embodiment.

As illustrated in FIG. 7, the CINR estimator 400 includes a signal power estimator 420 and an interference and noise power estimator 430. The interference and noise power estimator 430 receives N pilot signals from N outputs of the FFT processor 219. In accordance with this embodiment of the present invention, because the interference and noise power estimator 430 uses N signals output from the FFT processor 219, the pilot signal selector 510 illustrated in FIG. 5 is not required. However, the CINR estimator 400 can include a pilot signal selector for selecting a pilot signal according to characteristics of a communication system to which the present invention is applied.

It is assumed that the k-th signal of an IFFT input from among transmitted signals is $x_k$ and the k-th signal of an FFT output from among received signals is $y_k$. Here, assuming that the pilot signal undergoes binary phase shift keying (BPSK) modulation, $x_k=1$ or $-1$ ($k=1, 2, \ldots, N$) is used for convenience. Assuming that the channel characteristic between $x_k$ and $y_k$ is $H_k$ and the noise is $n_k$, the received signal can be expressed by the following Equation (1).

$$y_k = H_k x_k + n_k, k=1, 2, \ldots, N \quad (1)$$

In Equation (1), because $x_k$ denotes a preset pilot sequence, the receiver recognizes the value of $x_k$ value. Here, $y_k$ denotes a value obtained by measurement. Note that the interference from other transmitters is modeled as noise and is assumed to be incorporated into the noise term. This assumption holds if the pilot sequence from other transmitters are orthogonal to the transmitter of interest. And the term 'noise' hereafter is interchangeable with the 'interference and noise'.

The CINR to be measured is defined by the following Equation (2). In Equation 2, the numerator is the sum of true-signal power values from which noise is excluded and the denominator is the sum of noise power values.

$$\text{CINR} = \frac{\sum_{k=1}^{N} |H_k x_k|^2}{\sum_{k=1}^{N} |n_k|^2} \quad (2)$$

In order for the noise components to be separated from the received signals in this embodiment, an $F_k$ value is defined as shown in Equation (3). The $F_k$ value is an intermediate value to be used for estimating the noise components.

$$F_1 = x^*_1 y_1 - x^*_2 y_2$$

$$F_k = 2x^*_k y_k - x^*_{k-1} y_{k-1} - x^*_{k+1} y_{k+1}, k=2, 3, \ldots, N-1$$

$$F_N = x^*_N y_N - x^*_{N-1} y_{N-1} \quad (3)$$

More specifically, N multipliers 310-1 to 310-N multiply N outputs from the FFT processor 219 by the transmitted signal, i.e., a preset sequence, as illustrated in FIG. 7. Therefore, when "1" and "−1" are transmitted at a transmitting side, the same requirement can be used. The N multipliers 310-1 to 310-N correspond to the correlator 520 illustrated in FIG. 5.

Outputs from the N multipliers 310-1 to 310-N are input into positive terminals of N adders 320-1 to 320-N. Moreover, outputs from N multipliers 310-1 to 310-N are input into negative terminals of the N adders 320-1 to 320-N.

Therefore, each of the outputs of the N adders 320-1 to 320-N is a difference between a value produced from each sub-carrier and a value produced from at least one adjacent sub-carrier, such that signal components are cancelled out and only noise components remain. The N adders 320-1 to 320-N correspond to the signal noise producer 530 illustrated in FIG. 5.

Referring to FIG. 7, a signal adjacent to the first signal $y_1$ of N signals is only one signal $y_2$ and a signal adjacent to the last signal $y_N$ is only one signal $y_{N-1}$. The number of signals adjacent to another signal except for the first and last signals is two. For example, a signal $y_k$ has two adjacent signals $y_{k-1}$ and $y_{k+1}$. Therefore, the value of the first or last signal $y_1$ or $y_N$ of the N signals multiplied by the transmitted signal $x_1$ or $x_N$ respectively associated therewith is subtracted by a value of the adjacent sub-carrier signal multiplied by the transmitted signal associated therewith. Further, a value of the remaining signal $y_k$ multiplied by 2 and the transmitted signal $x_k$ associated therewith is subtracted by one adjacent sub-carrier signal $y_{k-1}$ multiplied by the transmitted signal $x_{k-1}$ associated therewith and the other adjacent sub-carrier signal $y_{k+1}$ multiplied by the transmitted signal $x_{k+1}$ associated therewith.

Consequently, resulting values $F_1$ to $F_N$ are noise components from which signal components are cancelled out.

When the value of $y_k$ in the resulting values $F_1$ to $F_N$ of the above Equation (3) is substituted by the above Equation (1), the following Equation (4) can be written according to signal and noise components.

$$F_1 = H_1|x_1|^2 - H_2|x_2|^2 + (x^*_1 n_1 - x^*_2 n_2)$$

$$F_k = 2H_k|x_k|^2 - H_{k-1}|x_{k-1}|^2 - H_{k+1}|x_{k+1}|^2 + (2x^*_k n_k - x^*_{k-1} n_{k-1} - x^*_{k+1} n_{k+1}), k=2, 3, \ldots, N-1$$

$$F_N = H_N|x_N|^2 - H_{N-1}|x_{N-1}|^2 + (x^*_N n_N - x^*_{N-1} n_{N-1}) \quad (4)$$

In Equation (4), terms before the parentheses are signal components and values within the parentheses are noise components. Assuming that adjacent sub-carriers channels have almost identical channel characteristics, the following Equation (5) can be written.

$$H_k \approx H_{k-1} \approx H_{k+1} \quad (5)$$

According to Equation (5), values before the parentheses in the above Equation (4) are zeros, such that signal components are cancelled out and noise components remain. A value of the noise component to be substituted into Equation (2) is squared and the noise power is estimated. That is, when a value in the parenthesis, indicating the noise component, is squared, $F_k$ power is the same as in the following Equation (6).

$$|F_1|^2 = |n_1|^2 + |n_2|^2 - 2x_1 x_2 Re\{n^*_1 n_2\}$$

$$|F_k|^2 = 4|n_k|^2 + |n_{k-1}|^2 + |n_{k+1}|^2 - 4x_k x_{k+1} Re\{n^*_k n_{k+1}\} - 4x_k x_{k-1} Re\{n^*_k n_{k-1}\} + 2x_{k+1} x_{k-1} Re\{n^*_{k+1} n_{k-1}\},$$
$$k = 2, 3, \ldots, N-1$$

$$|F_N|^2 = |n_N|^2 + |n_{N-1}|^2 - 2x_N x_{N-1} Re\{n^*_N n_{N-1}\} \quad (6)$$

In order for the sum of $|F_k|^2$ values to be calculated in the above Equation (6), $K_k$ is defined as in the following Equation (7) for convenience.

$$K_k = -4x_k x_{k+1} Re\{n^*_k n_{k+1}\} - 4x_k x_{k-1} Re\{n^*_k n_{k-1}\} + 2x_{k+1} x_{k-1} Re\{n^*_{k+1} n_{k-1}\} \quad (7)$$

If the above Equation (7) is substituted into $|F_k|^2$ of the above Equation (6), Equation (8) is obtained.

$$\sum_{k=2}^{N-1} |F_k|^2 = \sum_{k=2}^{N-1} (4|n_k|^2 + |n_{k-1}|^2 + |n_{k+1}|^2) + \sum_{k=2}^{N-1} K_k \quad (8)$$

In Equation (8), the second term, that is, the sum of $K_k$ values, is approximately zero because the number of 1's is similar to the number of −1's as a pilot sequence is usually a PN sequence and also because the following Equation (9) can be produced, as a mean value of noise components is zero, and the noise components are independent of each other.

$$\sum_{k=2}^{N-1} x_{k+a} x_{k+b} Re\{n^*_{k+a} n_{k+b}\} \approx 0, \text{ for } (a, b) = (0, 1), (0, -1), (1, -1) \quad (9)$$

The above Equation (9) can be rewritten as the following Equation (10).

$$\sum_{k=2}^{N-1} K_k \approx 0 \quad (10)$$

Because $F_1$ associated with the first signal $y_1$ or $F_N$ associated with the last signal $y_N$ has two noise components, the $F_1$ or $F_N$ value is squared and the squared $F_1$ or $F_N$ value is divided by 2. Because the noise components $F_k$ associated with other signals have four $|n_k|^2$ components, one $|n_{k-1}|^2$ component and one $|n_{k+1}|^2$ component, the $F_k$ value is squared and the squared $F_k$ value is divided by 6. These operations are performed by N operators 330-1 to 330-N as illustrated in FIG. 7. Further, all noise power components are added by an adder 340. A result of the addition is expressed by the following Equation (11).

$$\sum_{k=1}^{N} |n_k|^2 = \quad (11)$$

$$\frac{|F_1|^2}{2} + \frac{|F_N|^2}{2} + \sum_{k=2}^{N-1} \frac{|F_k|^2}{6} + \frac{1}{3}(|n_1|^2 + |n_N|^2 - |n_2|^2 - |n_{N-1}|^2) +$$

$$x_1 x_2 Re\{n^*_1 n_2\} + x_N x_{N-1} Re\{n^*_N n_{N-1}\} - \frac{1}{6} \sum_{k=2}^{N-1} K_k$$

In Equation (11), because a value within the parenthesis and values of the terms subsequent thereto are very small as compared with the total value and can be neglected, the total noise power can be estimated using the following Equation (12).

$$\sum_{k=1}^{N} |n_k|^2 = \frac{|F_1|^2}{2} + \frac{|F_N|^2}{2} + \sum_{k=2}^{N-1} \frac{|F_k|^2}{6} \quad (12)$$

In this case, the first and second terms in Equation (12) may be omitted, if N is sufficiently large. Finally, the signal power can be written as the following Equation (13).

$$\sum_{k=1}^{N} |y_k - n_k|^2 = \sum_{k=1}^{N} |y_k|^2 + |n_k|^2 - 2Re\{n^*_k (H_k x_k + n_k)\} \quad (13)$$

$$= \sum_{k=1}^{N} |y_k|^2 - \sum_{k=1}^{N} |n_k|^2 - \sum_{k=1}^{N} 2Re\{n^*_k H_k x_k\}$$

When the total noise power is subtracted from the total signal power $|y_1|^2$ to $|y_N|^2$, the power of a signal from which the interference and noise are removed can be obtained. Therefore, the N operators 330-1 to 330-N and the adder 340 correspond to the noise power producer 540 illustrated in FIG. 5.

Further, power of an output signal from the FFT processor 219 is calculated through square operators 360-1 to 360-N as illustrated in FIG. 7. As outputs of the square operators 360-1 to 360-N are added by an adder 370, the total reception signal power is produced. Therefore, the square operators 360-1 to 360-N and the adder 370 correspond to the signal power estimator 420 illustrated in FIG. 3.

As in the above Equation (13), a subtracter 440 subtracts the total interference and noise power from the total reception signal power. Because the last term can be neglected in the above Equation 13, the above Equation (13) can be approximated to the subtraction of the noise power from the total reception power. Finally, an estimation value of the CINR can be produced as in the following (14).

$$CINR_{est} = \frac{\sum_{k=1}^{N} |y_k|^2 - \sum_{k=1}^{N} |n_k|^2}{\sum_{k=1}^{N} |n_k|^2} \quad (14)$$

The resultant value of subtracting the total noise power from the total reception power is divided by the total noise power by a multiplier 460, such that the estimation value of the CINR is calculated.

As described above, one embodiment of the CINR estimator in accordance with the present invention uses two adjacent sub-carriers in relation to each sub-carrier. In general, any number of adjacent sub-carriers may be used. The above Equation (3) can be rewritten as the following Equation (15) wherein, $F_k$ is the difference as the interference and noise of signal, a nonnegative $W_l$ is the number of left-side adjacent sub-carriers, a nonnegative $W_r$ is the number of right-side adjacent sub-carriers, $x_k$ is the $K^{th}$ reference signal, and $y_k$ is the $K^{th}$ received signal $$F_k = (W_l + W_r)x_k^* y_k - \sum_{m=1}^{W_l} x_{k-m}^* y_{k-m} - \sum_{m=1}^{W_r} x_{k+m}^* y_{k+m} \qquad (15)$$

The above Equation (12) can be rewritten as the following Equation (16) such that the noise power can be obtained.

$$\sum_{k=1}^{N} |n_k|^2 \cong \sum_{k=1+W_l}^{N-W_r} \frac{|F_k|^2}{(W_l + W_r)^2 + (W_l + W_r)} \qquad (16)$$

Figure 8:
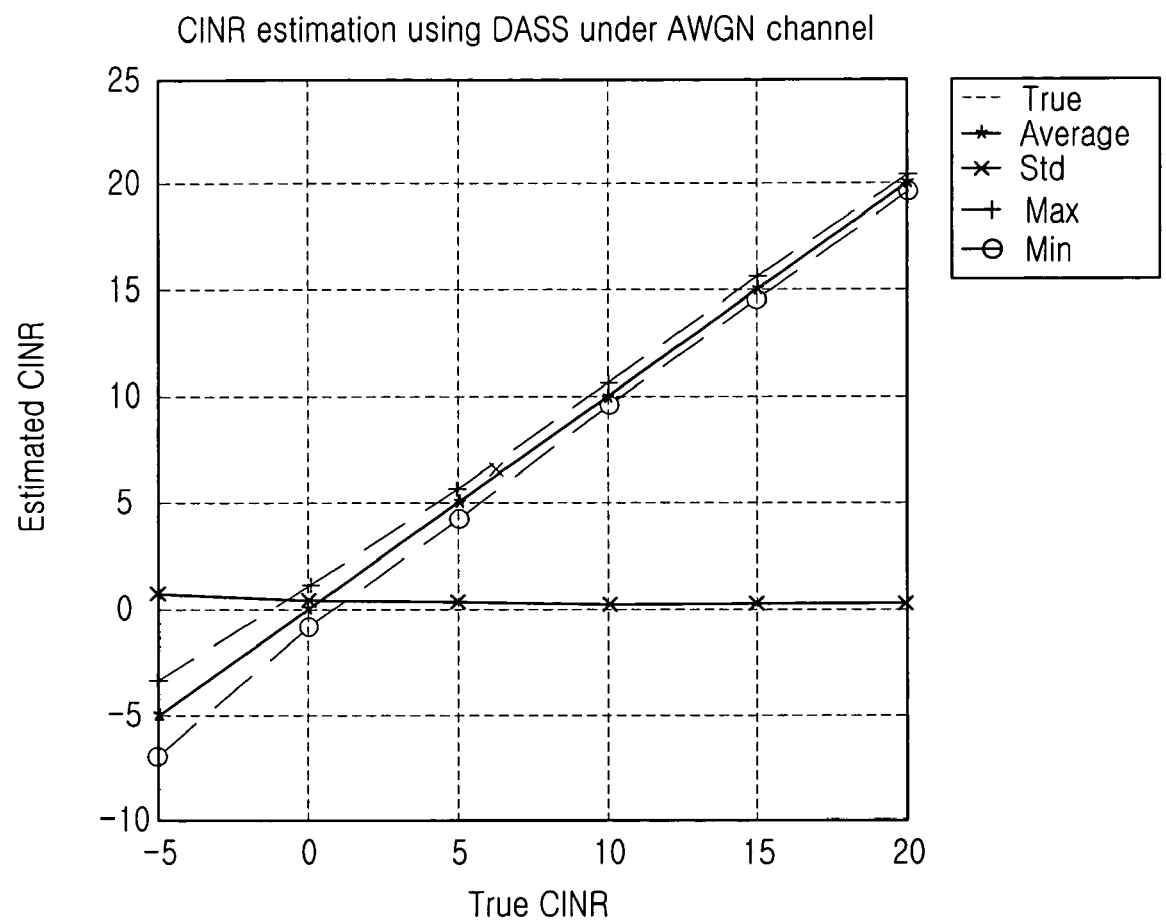
FIG. 8 is a graph illustrating performance of the CINR estimator to which the present invention is applied in an additive white Gaussian noise (AWGN) environment.
Figure 9:
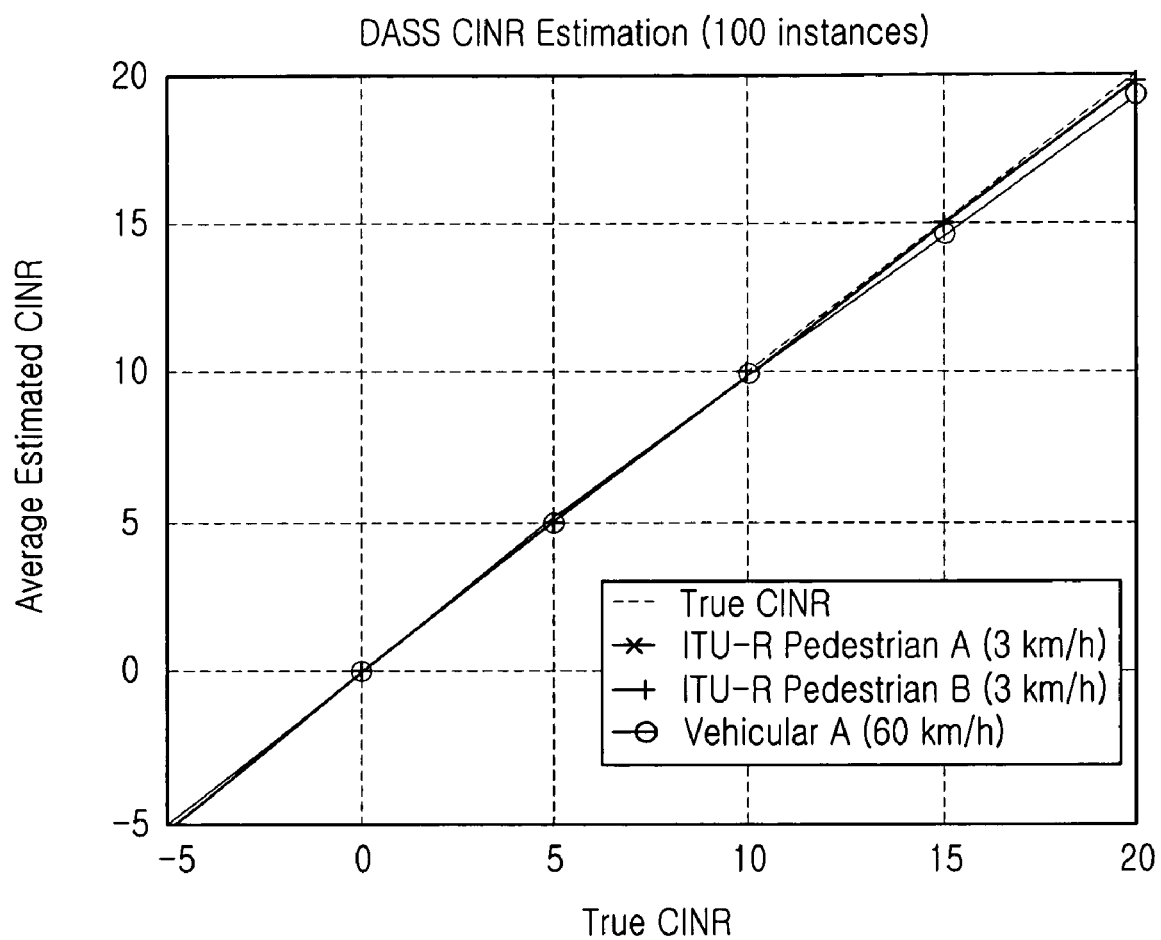
FIG. 9 is a graph illustrating average performance of the CINR estimator to which the present invention is applied in a channel model environment of International Telecommunication Union Radio communication sector (ITU-R).

As described above, the performance of the CINR estimator to which the present invention is applied is illustrated in FIGS. 8 and 9. FIG. 8 is a graph illustrating performance of the CINR estimator to which the present invention is applied in an additive white Gaussian noise (AWGN) environment; and FIG. 9 is a graph illustrating average performance of the CINR estimator to which the present invention is applied in a channel model environment of International Telecommunication Union Radio communication sector (ITU-R). Here, interference incoming from other transmitters is modeled by the AWGN, since a large number of random parameters i.e., the sum of interference components incoming from other transmitters, has Gaussian distribution due to the central limit theorem.

A simulation environment uses 2048 FFT at a bandwidth of 10 MHz, and the length of a pilot sequence is 776. According to 1000 estimations, the figures show the average, the maximum, the minimum and the standard deviation. As apparent from FIGS. 8 and 9, it can be seen that a CINR estimation value is almost equal to an actual CINR value.

In accordance with the present invention, the OFDM receiver can correctly estimate a parameter necessary for power control or adaptive modulation/demodulation, etc., that is, a CINR.

Although the preferred embodiments of the present invention have been disclosed for illustrative purposes, those skilled in the art will appreciate that various modifications, additions, and substitutions are possible, without departing from the scope of the invention. For example, the present invention has been applied to the OFDM system, but the present invention can be applied to an orthogonal frequency division multiple access (OFDMA) system and discrete multi-tone (DMT) technology.

Accordingly, the present invention is not limited to the above-described embodiments, but the present invention is defined by the claims, which follow, along with their full scope of equivalents.

What is claimed is:

1. An apparatus for estimating noise in a communication system, comprising:
   a correlator for correlating a plurality of sub-carriers with a reference sequence on an element-by-element basis and outputting a result of the correlation; and
   a signal noise calculator for calculating a difference between a correlation value, output by the correlator, associated with each of the plurality of sub-carriers and a correlation value produced from at least one adjacent sub-carrier output by the correlator;
   wherein the at least one adjacent sub-carrier comprises at least one sub-carrier closest to each of the plurality of sub-carriers according to characteristics of the communication system and the number of the at least one adjacent sub-carrier is different according to characteristics of the communication system.

2. The apparatus of claim 1, further comprising:
   a reference sequence signal selector for selecting the plurality of sub-carriers to be used for the reference sequence and outputting the selected sub-carriers to the correlator.

3. The apparatus of claim 2, wherein the reference sequence signal selector selects the plurality of sub-carriers having a same time domain index and different frequency indices from among sub-carriers of at least one of a received pilot, a preamble, a mid-amble, and a post-amble.

4. The apparatus of claim 2, wherein the reference sequence signal selector selects the plurality of sub-carriers having a same frequency domain index and different time domain indices from among sub-carriers of a received at least one of a pilot a preamble, a mid-amble, and a post-amble.

5. The apparatus of claim 2, wherein the reference sequence signal selector randomly selects the plurality of sub-carriers in a predetermined data domain including sub-carriers having different time domain indices and different frequency domain indices from at least one of a pilot a preamble, a mid-amble, and a post-amble.

6. The apparatus of claim 5, wherein the plurality of sub-carriers are selected to have a high correlation coefficient with adjacent sub-carriers.

7. The apparatus of claim 5, wherein the plurality of sub-carriers are orthogonal frequency division multiple access (OFDMA) signals.

8. The apparatus of claim 5, wherein the plurality of sub-carriers are orthogonal frequency division multiplexing (OFDM) signals.

9. The apparatus of claim 5, wherein the plurality of sub-carriers are discrete multi-tone (DMT) signals.

10. The apparatus of claim 5, wherein the difference of the signal noise calculator is estimated at least one of an interference and a noise value.

11. The apparatus of claim 1, further comprising a noise power calculator for calculating power of the difference.

12. A method for estimating noise power in a communication system, comprising:
    correlating a plurality of sub-caters with a preset reference sequence on an element-by-element basis; and
    calculating a difference between a correlation value associated with each of the plurality of sub-carriers and a correlation value produced from at least one adjacent sub-carrier;
    wherein the at least one adjacent sub-carrier comprises at least one sub-carrier closest to each of the plurality of sub-carriers according to characteristics of the communication system and the number of the at least one adjacent sub-carrier is different according to characteristics of the communication system.

13. The method of claim 12, further comprising:
selecting the reference sequence having a same time domain index and different frequency domain indices from among sub-carriers of at least one of a pilot, a preamble, a mid-amble, and a post-amble.

14. The method of claim 12, further comprising:
selecting the reference sequence having a same frequency domain index and different time domain indices from among the sub-carriers of at least one of a received pilot and a preamble signal.

15. The method of claim 12, further comprising:
randomly selecting the reference sequence in a predetermined data domain including sub-carriers having different time domain indices and different frequency domain indices from at least one of a pilot, a preamble, a mid-amble, and a post-amble.

16. The method of claim 15, wherein the reference sequence are selected to have a high correlation coefficient with adjacent sub-carriers.

17. The method of claim 12, wherein the difference is at least one of estimated noise and an interference.

18. The method of claim 12, further comprising:
calculating a noise power by power of the difference.

19. An apparatus for estimating a carrier to interference and noise ratio (CINR), comprising:
a signal power estimator for measuring a total signal power from a received signal:
an interference and noise power estimator for producing correlation values associated with a plurality of sub-carriers by correlating the received signal with a reference sequence on an element-by-element basis, calculating a difference between a correlation value associated with each sub-carrier and a correlation value associated with at least one adjacent sub-carrier, and estimating an interference and noise power from the difference; and
a CINR estimator for estimating a ratio between an estimated tine-signal power value and an estimated interference and noise power value using the total signal power value output from the signal power estimator and a noise power value output from the interference and noise power estimator;
wherein the at least one adjacent sub-carrier comprises at least one sub-carrier closest to each of the plurality of sub-carriers according to characteristics of a communication system and the number of the at least one adjacent sub-carrier is different according to characteristics of the communication system.

20. The apparatus of claim 19, wherein the received signal is a signal processed by a Fast Fourier Transform (FFT) operation.

21. The apparatus of claim 19, wherein an interference and noise power estimator comprising:
a correlator for correlating the received signal with a reference sequence on an element-by-element basis;
an interference and noise calculator for calculating the difference between a correlation value associated with each of the plurality of sub-carriers and a correlation value associated with its respective at least one adjacent sub-carrier; and
an interference and noise power calculator for calculating power from the difference between the correlation values.

22. The apparatus of claim 19, wherein the correlator is multiplier.

23. The apparatus of claim 19, wherein the interference and noise calculator performs the calculation using:

$$F_k = (W_l + W_r)x_k^* y_k - \sum_{m=1}^{W_l} x_{k-m}^* y_{k-m} - \sum_{m=1}^{W_r} x_{k+m}^* y_{k+m}$$

where $F_k$ is the difference as the interference and noise of signal, a nonnegative $W_l$ is the number of left-side adjacent sub-carriers, a nonnegative $W_r$ is the number of right-side adjacent sub-carriers, $x_k$ is the $k^{th}$ reference signal, and $y_k$ is the $k^{th}$ received signal.

24. The apparatus of claim 23, wherein the interference and noise power calculator performs the calculation using:

$$\sum_{k=1}^{N} |n_k|^2 \cong \sum_{k=1+W_l}^{N-W_r} \frac{|F_k|^2}{(W_l + W_r)^2 + (W_l + W_r)}$$

where $\sum_{k=1}^{N} |n_k|^2$ is sum of power of the interference and noise.

25. The apparatus of claim 23, wherein the CINR estimator uses:

$$CINR_{est} = \frac{\sum_{k=1}^{N} |y_k|^2 - \sum_{k=1}^{N} |n_k|^2}{\sum_{k=1}^{N} |n_k|^2} \text{ where the}$$

$\sum_{k=1}^{N} |y_k|^2$ is sum of the power of the received signal.

26. The apparatus of claim 19, further comprising,
a selector for selecting the reference sequence according to at least one of the given pilot, preamble, mid-amble, and post-amble.

27. A method for estimating a carrier to interference and noise ratio (CINR), comprising:
measuring a total signal power from a received signal:
producing correlation values associated with a plurality of sub-carriers by correlating the received signal with a reference sequence on an element-by-element basis;
calculating a difference between a correlation value associated with each sub-carrier and a correlation value associated with at least one adjacent sub-carrier, wherein the difference is at least one of an interference and noise value of corresponding sub-carrier;
estimating a power of the at least one of the interference and the noise by using the difference; and
estimating a ratio (CINR) between an estimated true-signal power value and an estimated interference and noise power value using the total signal power and the at least one of the interference and the noise power;
wherein the at least one adjacent sub-carrier comprises at least one sub-carrier closest to each of the plurality of sub-carriers according to characteristics of a communication system and the number of the at least one adjacent sub-carrier is different according to characteristics of the communication system.

28. The method of claim 27, wherein the received signal is a signal processed by a Fast Fourier Transform (FFT) operation.

29. The method of claim 27, wherein the step of producing correlation value is calculated by multiplication the received signal and the reference signal.

30. The method of claim 27, wherein the step of calculating a difference is performed using:

$$F_k = (W_l + W_r)x_k^* y_k - \sum_{m=1}^{W_l} x_{k-m}^* y_{k-m} - \sum_{m=1}^{W_r} x_{k+m}^* y_{k+m},$$

where $F_k$ is the difference as the interference and noise of signal, a nonnegative $W_l$ is the number of left-side adjacent sub-carriers, a nonnegative $W_r$ is the number of right-side adjacent sub-carriers, $x_k$ is the $K^{th}$ reference signal, and $y_k$ is the $K^{th}$ received signal.

31. The method of claim 30, wherein the step of estimating a power of the at least one of the interference and the noise is performed using:

$$\sum_{k=1}^{N} |n_k|^2 \cong \sum_{k=1+W_l}^{N-W_r} \frac{|F_k|^2}{(W_l + W_r)^2 + (W_l + W_r)},$$

where $\sum_{k=1}^{N} |n_k|^2$ is sum of power of the interference and noise.

32. The method of claim 31, wherein the step of estimating the CINR is performed using:

$$CINR_{est} = \frac{\sum_{k=1}^{N} |y_k|^2 - \sum_{k=1}^{N} |n_k|^2}{\sum_{k=1}^{N} |n_k|^2},$$

where the $\sum_{k=1}^{N} |y_k|^2$ is sum of the power of the received signal.

33. The method of claim 27, further comprising the step of selecting the reference sequence according to the at least one of the given pilot, preamble, mid-amble, and post-amble.

* * * * *

UNITED STATES PATENT AND TRADEMARK OFFICE
CERTIFICATE OF CORRECTION

PATENT NO. : 7,623,569 B2
APPLICATION NO. : 10/958485
DATED : November 24, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1273 days.

Signed and Sealed this

Twenty-sixth Day of October, 2010

David J. Kappos
*Director of the United States Patent and Trademark Office*